Nov. 12, 1929.	M. M. MORATTA	1,735,291
PISTON RING CONSTRUCTION
Filed April 10, 1925   2 Sheets-Sheet 1
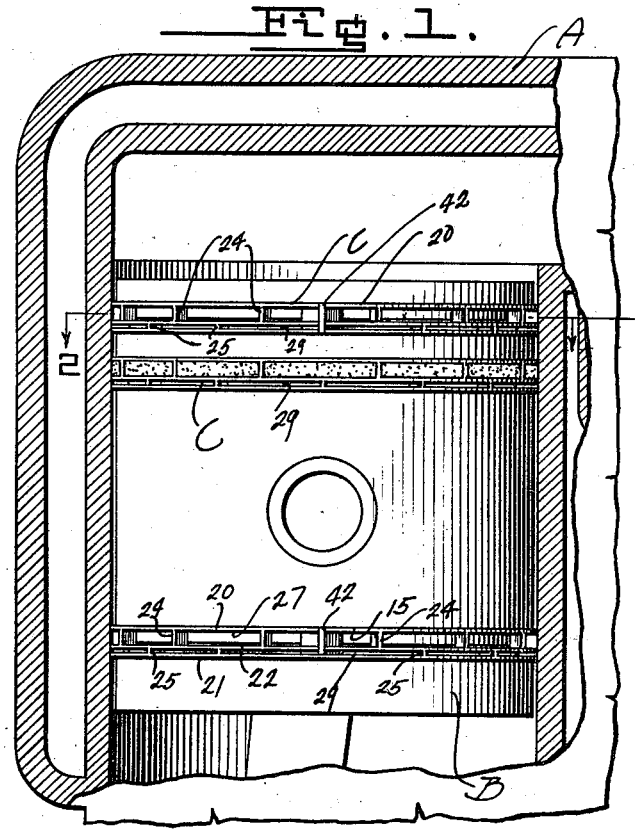
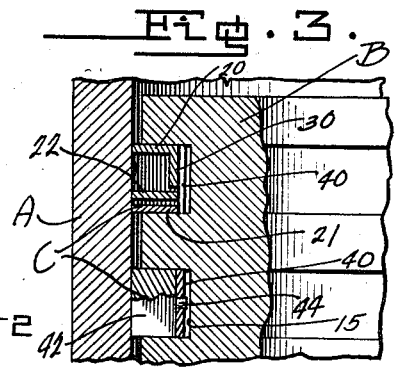
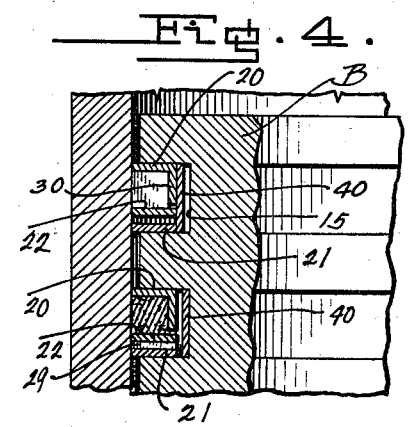
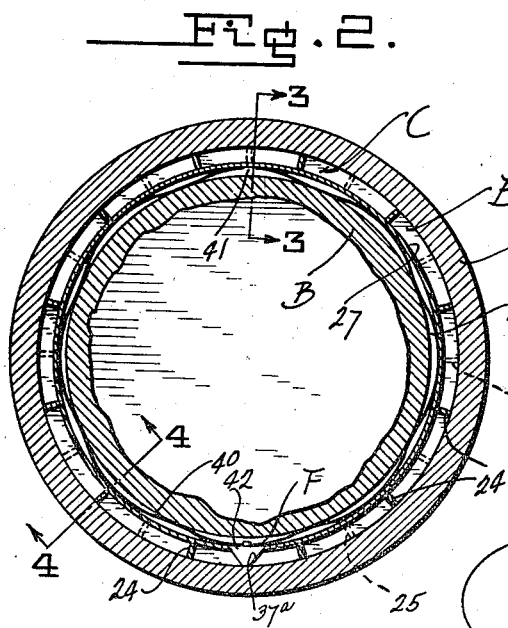
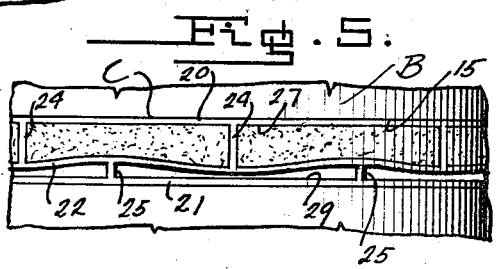
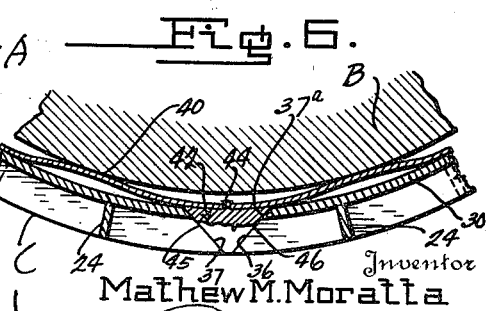
Inventor
Mathew M. Moratta Nov. 12, 1929.    M. M. MORATTA    1,735,291
PISTON RING CONSTRUCTION
Filed April 10, 1925    2 Sheets-Sheet 2
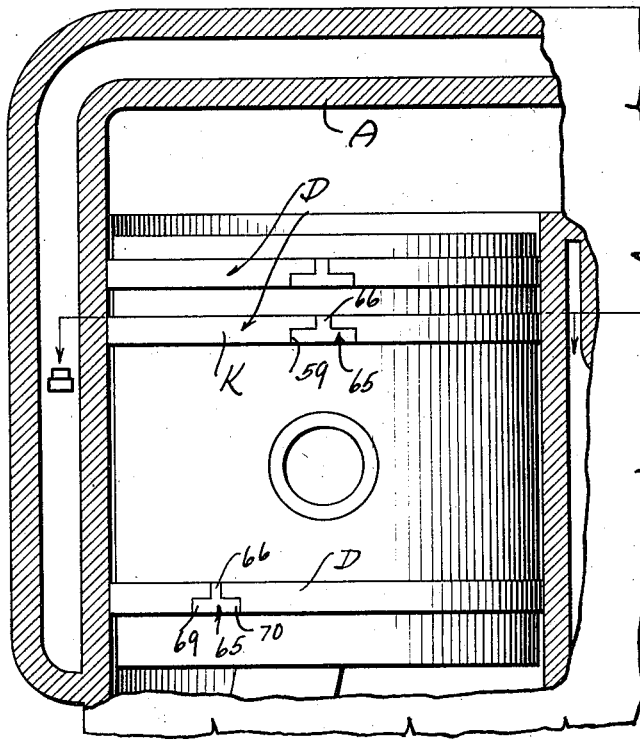
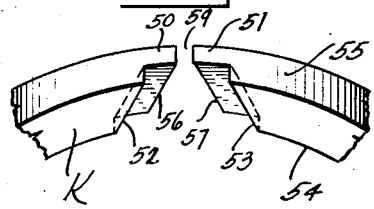
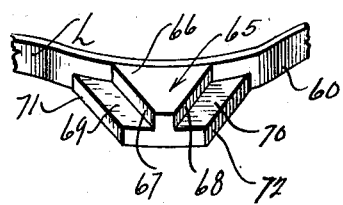
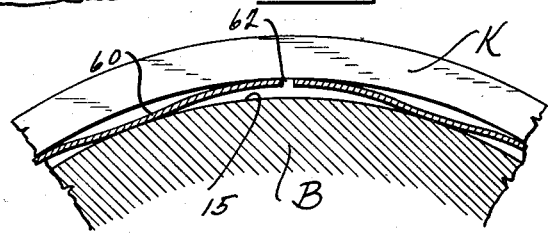
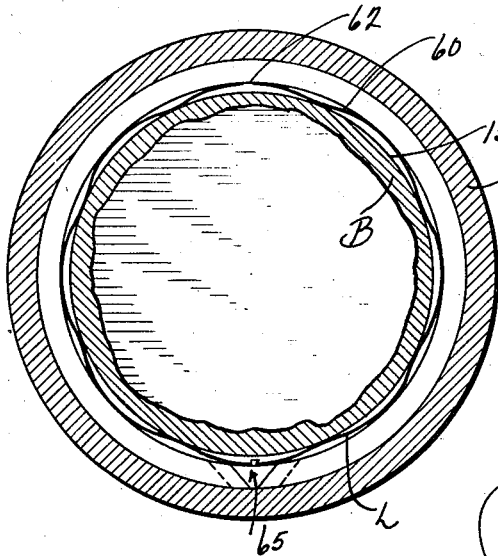
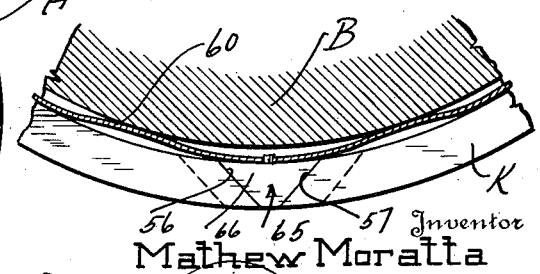

Patented Nov. 12, 1929

1,735,291

UNITED STATES PATENT OFFICE

MATTHEW M. MORATTA, OF PRINCETON, INDIANA

PISTON-RING CONSTRUCTION

Application filed April 10, 1925. Serial No. 22,193.

This invention relates to improvements in piston ring constructions.

The primary object of this invention is the provision of an improved piston ring embodying a novel principle of construction by which the ring may accurately fit in the groove of a piston, and embodying a novel type of gap expanding structure by which the piston ring seats properly.

A further object of the invention is the provision of a novel type of piston ring which is transversely compressible so that it may be fitted into various widths of grooves of pistons, and by means of which the same may expand to completely fill the width of a piston groove which may become enlarged incident to wear.

A further object of this invention is the provision of novel means for expanding a piston ring and filling the gap thereof.

A further object of this invention is the provision of a novel type of piston ring construction embodying a ring portion which is transversely compressible, and novel means cooperating with the ring portion to expand the same and fill the gap.

Other objects and advantages of this invention will be apparent during the course of the following detailed description.

In the accompanying drawings, forming a part of this specification, and wherein similar reference characters designate corresponding parts throughout the several views, Figure 1 is a sectional view taken through an internal combustion engine cylinder, showing the piston operating therein with the novel type of piston ring construction therefor.

Figure 2 is a cross sectional view taken substantially on the line 2—2 of Figure 1.

Figures 3 and 4 are cross sectional views taken substantially on their respective lines in Figure 2 of the drawings.

Figure 5 is a fragmentary sectional view showing the manner in which the improved piston ring is transversely compressible to adapt it to various widths of grooves of pistons.

Figure 6 is a cross sectional view taken through the gap filling end of the improved piston ring.

Figure 7 is a side elevation of the piston, showing the improved type of gap filling device for one-piece piston rings.

Figure 8 is a cross sectional view taken substantially on the line 8—8 of Figure 7, showing more particularly the improved construction of the expanding and gap filling device for piston rings.

Figure 9 is an enlarged fragmentary sectional view taken through a portion of the piston ring and piston ring structure.

Figure 10 is an enlarged fragmentary sectional view taken through a portion of the improved piston ring construction adjacent the gap thereof.

Figures 11 and 12 are fragmentary perspective views of details of the invention.

In the drawings, wherein for the purpose of illustration is shown only a preferred embodiment of the invention, the letter A may generally designate an engine housing of any approved character providing cylinders therein within which pistons B are adapted to operate. The pistons B are provided with grooves 15 of any approved character, adapted to receive either of the types of piston ring structures C or D.

Referring to the type of piston ring C, the same is of novel construction, comprising the ring portion E and gap filling structure F.

Referring to the structure of the ring body E, the same is preferably of the split type, and comprises upper, lower, and intermediate flat portions 20, 21 and 22 respectively, which are held in a predetermined spaced relation. These portions 20, 21 and 22 are preferably of the same width, and annular in form, although flat to permit their transverse flexing. The portions may be referred to as leaf or spring portions, and the portions 20 and 22 are connected by means of spaced ribs or partitions 24, which may be secured to said portions at right angles, as by welding or in any other approved manner. In analogous manner the leaf portions 21 and 22 are held spaced by means of the spacing lugs or partitions 25, which are less in height than the portions 24, and thus the portions 20 and 21 are held spaced for a greater distance than the portions 21 and 22. The spacing between the leaf or spring portions 20 and 22 may be referred to as a groove 27 adapted to receive packing material, although this groove is really made up of a plurality of segmental shaped compartments separated by the partitions 24. The shorter lugs 25 are staggered with respect to the lugs or partitions 24, and the distance between the leaf portions 21 and 22 may likewise be referred to as a groove about the structure, adapted to receive oil. Incident to the staggering of the lugs or partitions 24 and 25 the ring body E may be transversely flexed, to vary the distance between the top and bottom portions 20 and 21, so that the ring body E may be accommodated in piston grooves of various widths. At the inner edge of the top portion or leaf 20 it is preferred to provide a right angled packing retaining flange 30, which as illustrated in the drawings, has its lowermost edge normally spaced a short distance upwardly from the facing surface of the intermediate portion 22, so that the leaves or portions 20 and 22 may be flexed towards each other. This flexing action is well illustrated in Figure 5 of the drawings, wherein it is indicated how the intermediate leaf portion 22 is permitted to flex or bend, incident to the nature of the same and the staggered provision of the lugs or partitions 24 and 25 in the grooves 27 and 29.

The piston body E thus provides what are in effect a pair of circumferential grooves thereabout, the upper one of which is adapted to receive a packing material such as graphite, and the lower one of which may receive the oil scraped from the cylinder walls, to lubricate the same, and gives sufficient room for the transverse compression of the ring. At its ends the piston body E has the faces 36 and 37 thereof divergent from the inner periphery of the piston body towards the outer surface thereof, providing a gap 37$^a$, substantially triangular in form.

Referring to the gap filling structure F, the same preferably comprises a split corrugated ring member 40 of spring steel, the ends of which are spaced to provide the gap 41. Diametrically opposite the spaced ends of the said corrugated spring ring 40, a triangular shaped gap filling member 42 is fixedly connected, which provides the convergent faces 45 and 46 extending outwardly from the connection of the gap filling member 42 with the said corrugated ring 40; the rear of the gap filling member 42 preferably having a lug 44 which is riveted or otherwise secured to the corrugated ring member 40, and substantially as is illustrated in Figure 6 of the drawings.

Referring to the application of the improved piston ring structure C upon the piston B, the gap filling ring structure F is first slipped into the groove 15 of the piston, where the same snugly engages in the said grooves at the bottom thereof. The piston ring body E is then slipped into the groove 15, with the packing groove 27 thereof uppermost towards the firing chamber of the cylinder. The gap filling member 42 is of course placed into the gap 37$^a$, and the convergent faces thereof engage the convergent faces 36 and 37 of the ring body E, completely filling the gap. This gap filling member 42 is of soft material, either copper or aluminum, softer than the materials of the piston ring body E or the engine cylinder walls, so that the wear is concentrated on the piston ring gap filling member 42, preventing the scoring of cylinder walls and undue wear upon the piston ring. The nature of the corrugated spring member 40 of course is to expand the piston ring body E into engagement with the cylinder walls, and to force the gap filling member into snug gap fitting relation in the gap 37$^a$.

From the foregoing description of the improved piston ring construction, it can be seen that the gap filling structure F will take up end play as the ring becomes worn, preventing the ring from working back and forth, and reducing its tendency to slap. It also provides a continuous and uninterrupted seal at the working face of the ring, preventing loss of compression. The cooperation of the gap filling structure F with the novel piston ring body E is essential, since the same not only acts to prevent slap and vibration, but buffs the forces coming on the piston ring body, maintaining the same in proper position in the piston groove to function wthout loss of compression.

The principle of the improved gap filling structure may be applied in connection with solid one-piece rings, and this has been more particularly illustrated in the piston ring structure in Figures 7 to 12 inclusive, wherein the piston ring structure D comprises a one-piece piston ring body K, and the gap filling construction L.

The piston ring body K is preferably of the split type, comprising an integral body having reduced portions 50 and 51 extending outwardly from the ends thereof. The ends of the body K adjacent the junctures of the said body K with the extensions 50 and 51 provide faces 52 and 53 which are in converging relation from the inner periphery 54 with the outer periphery 55. In analogous manner the facing edges 56 and 57 of the reduced extensions 50 and 51 are convergent from the inner periphery towards the outer periphery of the piston body K. The space between the facing edges 52 and 53 is of course greater than the space between the facing edges 56 and 57, and these spaces together provide the piston ring gap 59; the said gap being triangular shaped similar to the gap 37ª of the ring body E.

Referring to the gap filling structure L, the same comprises a corrugated spring ring member 60, split to permit the expansion thereof, and diametrically opposed from the split 62 the same supports the gap filling member 65, which is of a novel construction. This gap filling member provides a substantially triangular shaped portion 66 having edges 67 and 68 which diverge from the connection of said gap filling member with the spring member 60. Laterally extending from the triangular shaped portion 65 are the reduced flange portions 69 and 70, which have their outer edges 71 and 72 respectively convergent from the connection of the gap filling member with the corrugated spring ring 60. In filling the gap of the ring body K the gap filling member 65 and its triangular portion 66 is slipped into the space between the convergent edges 56 and 57, with the edges 67 and 68 in abutment with said convergent edges 56 and 57, and in analogous manner the reduced or flanged portions 69 and 70 fit into the spaces in overlapping relation with the reduced portions 50 and 51 of the ring body K, with the edges 71 and 72 in abutment with the edges 52 and 53 respectively of the ring body K.

The assemblage of the improved piston ring structure D is obvious. The gap filling structure L is slipped into the piston groove 15, with the corrugated ring 60 at the bottom of the groove. The one-piece split piston ring body K is then slipped into the piston groove, with the gap filling member 65 inserted in the gap 59, as above described, and as is clearly illustrated in the drawings.

From the foregoing description of this invention it is apparent that a novel type of piston ring structure has been provided, which embodies characteristics which will permit of the use of the piston ring structure in various sized piston grooves, and to compactly and efficiently fill the same, and to compensate in themselves for wear. Thus, a piston ring is provided having the gap filled to prevent loss of compression, and one in which the groove is also filled at all times to prevent piston slap and vibration. The fact that the gap filling members 42 and 65 are made of some soft metal, such as copper or aluminum tends to concentrate the wear thereon, and prevent scoring of cylinders, and facilitates the buffing action.

Various changes in the shape, size, and arrangement of parts may be made to the forms of invention herein shown and described, without departing from the spirit of this invention or the scope of the claims.

I claim:

1. A piston ring construction comprising a pair of split substantially ring-shaped members, means yieldably connecting said members in spaced relation to provide a pair of concentric grooves outwardly facing from the outer periphery of said ring, and a flange carried by one of said members at the inner periphery of said ring terminating at its outer edge short of the other member of said ring.

2. A piston ring comprising upper and lower relatively thin substantially ring-shaped split members, means connecting said members so that they may be moved toward and away from each other in parallel planes of movement, said means providing a pair of circumferential grooves between said upper and lower members, and packing means filling one of said grooves, the other groove being open at the outer periphery of the ring.

3. As an article of manufacture a piston ring comprising a pair of relatively thin substantially ring-shaped split flexible members, means yieldably connecting said members in spaced relation including an intermediate split substantially ring-shaped member in parallelism with the last mentioned pair of split members and therewith providing circumferential pockets exposed at the outer periphery of the ring, said pockets being of unequal widths measured transversely of the plane of the piston ring.

4. As an article of manufacture a piston ring comprising a pair of relatively thin substantially ring-shaped split flexible members, means yieldably connecting said members in spaced relation including an intermediate split substantially ring-shaped member in parallelism with the first mentioned pair of split members and therewith providing circumferential pockets exposed at the outer periphery of the ring, said pockets being of unequal widths measured transversely of the plane of the piston ring and packing means in the pocket of greatest width.

5. A piston ring comprising a body having a pair of axially separated circumferentially elongated grooves, packing disposed in one of said grooves in exposed relation at the outer periphery of the ring, the other groove opening both at the outer and inner periphery of the ring, the part of the ring between said grooves being axially resilient.

6. As an article of manufacture a piston ring having upper and lower circumferential series of slots, the slots in one series being staggered with respect to those in the other series to define upper, lower and intermediate bars, the intermediate bar being axially resilient, and packing means in one of said series of slots, the other of said series of slots opening at both the outer and inner peripheries of the ring.

7. In a piston ring structure the combination of a body slotted transversely to provide upper and lower circumferential series of slots, with the slots in one series being staggered with respect to those in the other series, and the slots in each series separated by axial partitions, the partitions dividing one of the series of slots being staggered with respect to the partitions separating the slots of the other series, the upper and lower series of slots providing upper, lower and intermediate bars, with the intermediate bar axially resilient, said series of slots opening at both the inner and outer peripheries of the ring, packing means in the upper series of slots in exposed relation at the outer periphery of the ring body, and retaining means at the inner periphery of the ring across the slots of the upper series to hold the packing means in position.

8. As an article of manufacture a composite piston ring structure comprising a main ring having staggered series of circumferentially elongated radial openings separated by solid portions, and packing means disposed in one of the series of radial openings in exposed relation on the outer periphery of the ring, the remaining radial openings extending in opening relation at both the outer and inner peripheries of the ring in an unobstructed relation for passage of oil therethrough.

MATTHEW M. MORATTA.